US010827161B2

(12) United States Patent
Tomkevicius

(10) Patent No.: US 10,827,161 B2
(45) Date of Patent: Nov. 3, 2020

(54) DEPTH CODEC FOR 3D-VIDEO RECORDING AND STREAMING APPLICATIONS

(71) Applicant: EF LONDON LTD., London (GB)

(72) Inventor: Arunas Tomkevicius, Kaunas (LT)

(73) Assignee: EF London, Ltd, London (GB)

( * ) Notice: Subject to any disclaimer, the term of this patent is extended or adjusted under 35 U.S.C. 154(b) by 0 days.

(21) Appl. No.: 16/361,195

(22) Filed: Mar. 21, 2019

(65) Prior Publication Data

US 2020/0304773 A1    Sep. 24, 2020

(51) Int. Cl.
     *H04N 13/189*      (2018.01)
     *H04N 13/194*      (2018.01)
     *H04N 19/597*      (2014.01)

(52) U.S. Cl.
     CPC ......... *H04N 13/189* (2018.05); *H04N 13/194* (2018.05); *H04N 19/597* (2014.11)

(58) Field of Classification Search
None
See application file for complete search history.

(56) References Cited

U.S. PATENT DOCUMENTS

| 2014/0055560 | A1* | 2/2014 | Fu | ............................. | G06T 7/40 |
| --- | --- | --- | --- | --- | --- |
| | | | | | 348/42 |
| 2016/0248440 | A1* | 8/2016 | Greenfield | .............. | H03M 7/30 |

OTHER PUBLICATIONS

R. Krishnamurthy, Bing-Bing Chai, Hai Tao and S. Sethuraman, "Compression and transmission of depth maps for image-based rendering," Proceedings 2001 International Conference on Image Processing (Cat. No. 01CH37205), , 2001, pp. 828-831 vol. 3, DOI: 10.1109/ICIP.2001.958248. 821. Thessaloniki, Greece.

(Continued)

*Primary Examiner* — Heather R Jones
(74) *Attorney, Agent, or Firm* — Moser Taboada

(57) ABSTRACT

This invention provides a codec for depth compression and decompression in 3D-video streaming, recording and visualization applications. PROBLEM: Use of 3D-video imaging is relevant to a vast of data to be recorded into storage media and streamed in real-time through communication media with bandwidth limitations. Reduction of 3D-video data amount can be achieved by using variety of compression methods. Some conventional methods of 2D-video processing are applicable also for 3D-video streams. However, significant reduction of video data amount is relevant to use of lossy processing methods, operation-greedy algorithms, and challenges for visual quality of the processed 3D-videos. SOLUTION: The codec for 3D-video depth information compression and decompression, by employing depth similarities between neighboring rows of a single depth frame, and capabilities of rANS-algorithm to compress sets of values that have highly irregular distribution. Further, the codec comprises a step of dynamic depth interlacing at pixel level, according to the detected movements in different regions of a pixel-depth frame, throughout the sequence of said frames. The codec enables both lossless and lossy compression-decompression techniques which allow to maintain efficiently and predictably the trade-off between visual quality of 3D-view and compression rate, and allows prediction of processing resources.

9 Claims, 7 Drawing Sheets

(56) References Cited

OTHER PUBLICATIONS

F. Nenci, L. Spinello and C. Stachniss, "Effective compression of range data streams for remote robot operations using H.264," 2014 IEEE/RSJ International Conference on Intelligent Robots and Systems, Chicago, IL, 2014, pp. 3794-3799, DOI: 10.1109/IROS.2014.6943095.

Jarek Duda, Khalid Tahboub, Neeraj J. Gadgil, Edward J. Delp, "The use of asymmetric numeral systems as an accurate replacement for Huffman coding", Picture Coding Symposium, 2015.

* cited by examiner

| Lossless Compression Codec | JPEG2000 | PNG | TIFF | ZLib | EF EVE™ codec |
|---|---|---|---|---|---|
| Raw bytes | 414720000 | 414720000 | 414720000 | 414720000 | 414720000 |
| Compressed | 14559343 | 11341354 | 21436208 | 13965799 | 9373020 |
| Compression rate | 28,5 | 36,6 | 19,3 | 29,7 | 44,2 |
| Normalized result size | 1,55 | 1,21 | 2,28 | 1.49 | 1 |
| Compression speed (ms/frame) | 135 | 57 - 830 | 33 | 24 - 46 | 26 |

DEPTH CODEC FOR 3D-VIDEO RECORDING AND STREAMING APPLICATIONS

FIELD OF INVENTION

The invention relates to digital processing, recording and streaming of 3D-videos. More specifically, it relates to coding and decoding of pixel-depth information in 3D-video streams. The invention discloses a codec for compression and decompression of 3D-video depth data, with controllable 3D-video quality and high compression/decompression speed.

BACKGROUND OF INVENTION

Digital video processing covers a variety of applications, methods, algorithms, tools and devices. A more specific field of 3D-video processing may use same methods and algorithms of general purpose and 2D-image processing but also it requires specific approaches, according to the purpose of a particular application.

This invention is specific to depth information encoding and compression in 3D-video streams and/or recording systems. The depth information, also known as depth map of a 3D-scene, is an image or image channel that contains information relating to the distance of the surfaces of scene objects from a viewpoint.

Depth Acquisition.

Some applications and 3D-processing methods re-create depth maps from the acquired 2D-views of a 3D-scene. These methods are applicable wherein it is possible to capture only 2D-views, but depth information is not straightforwardly acquirable, e. g., for scenes with distant or quickly moving objects, non-tangible or fuzzy objects. The depth information (or depth map) of the scene and its objects has to be re-created by some reconstruction method or predictive model, for example, from multiple 2D-views, or by object recognition and 3D-modelling, by context of the scene, by relying on pixel information from neighboring areas of the image, and so on. There are patent applications referring to some approaches for re-creating the depth information, e, g, US2011096832, US2014341289.

In other applications and herein, certain 3D-scenes can be acquired directly by means of special 3D-cameras which capture 2D-video frames already together with the corresponding frames of pixel-depth information. Said 3D-cameras are also known as RGB-D cameras or Depth sensors, for example, Kinect or Realsense camera. There can be a single camera or several cameras at viewpoints of 3D-scene installed. Nearly flat 3D-scenes can be successfully captured by a single RGB-D camera. In general case, multiple RGB-D cameras are needed at different viewpoints, in order to capture more complex 3D-scenes with shaded or invisible surfaces. In addition, the time-of-flight (TOF) sensors of RGB-D cameras poorly acquire the 3D-scene depths at the edges of objects, especially rounded objects, because the depth-sensing beam of infrared light poorly reflects from the surfaces being parallel to it. Typically, 2 or 3 cameras are necessary to create a sufficiently complete point-cloud of 3D-scene with the exposed objects and surfaces. In this way, the acquired depth information is apparent, detailed, and sophisticated 3D-processing for reconstruction of depth data may be not necessary. However, the relevant patent application US2014055560 discloses that "compression of depth data generated by a depth camera, such as the structured light camera used by the Kinect gaming device, is problematic. The size of the depth data imposes significant transmission and storage costs. While image/video compression methods can, in the abstract, be used for depth data compression, the noise and instability of the depth data associated with the depth images makes actual use of such image/video compression methods problematic".

Transmission and Storage.

The transmission and storage efficiency is relevant to costs expressed by data volume for storage and stream bitrate or throughput for transmission. For storage and transmission, different approaches may be used, dependently on the application setup. In some cases, it is more efficient to store and transfer the already reconstructed 3D-scene models such as point-clouds or meshes of the captured objects. The advantage of this approach is the reduced amount of stored or transferred data. Another approach is to store and transfer the raw unmodified RGB-D stream datasets captured from a RGB-D camera or plurality of cameras, for example, if 3D-scene rendering and visualization processors are not available onsite. The advantage of this approach is that the initial information acquired from the depth sensor is not lost or distorted in case of transmission with a lossless compression.

Processing of 3D-Video Data.

A variety of processing steps and functions may be applied to 2D-video and pixel-depth frames, before the final visualization of 3D-scene. The whole comprises but is not limited to: filtering, error-correction, restoration of missing data, depth data alignment, data encoding and decoding, data storage and transfer, data compression and decompression. The general criteria of 3D-video processing are:

Visual quality of 3D-scene representation which means how precisely the captured and reconstructed virtual 3D-scene corresponds to the real 3D-scene and how the viewing person is satisfied with the presented virtual 3D-scene;

Predictable and efficient volume of data processed. It is important for real-time streaming of 3D-videos over communication networks and recording them into digital media, and for efficient usage of network and storage resources. The control of video streaming bitrate is disclosed, for example, in patent application U.S. Pat. No. 6,055,330.

Predictable amount of processing operations and, thus, processing speed. It is important because of real-time processing of 3D-video streams and efficient usage of system resources.

2D-Video and Depth Alignment.

2D-video and depth information frames may be aligned. If pixel-depth information is missing due to some reasons, the 2D-video information has also to be discarded for such missing pixels. The opposite relation is also true: if 2D-video information is missing for some pixels, then the corresponding pixel-depth values also cleared. Only the valid pair of 2D-pixel and its depth values is meaningful and provides the integral information.

Several patent applications refer to solving issues of this type. Patent application US2014055560 describes techniques for setting depth values for invalid measurement regions of depth images, said values based on evaluations of depth values of neighboring pixels and of corresponding pixels from time-adjacent depth images. The application US2015010049 uses prediction of depth values by use of depth map modeling. Application US2008285654 use prediction to reconstruct depth values from geometric disparities of multiple 2D-views. All above approaches are different by concept and may be considered as complex, mainly due to simultaneous and mutual processing of depth data together with the 2D-video data, or with a prediction model, or from multiple 2D views.

Encoding and Compression.

Modern 3D-RGB-D video cameras generate a large amount of raw data. For example, a single full HD frame contains 1920*1080 pixels, wherein each single pixel is represented by 3 bytes of RGB information and 1.5-2 bytes (12-16 bits) of the pixel-depth information. The data amount of such 3D-video frame equals to:

For 12 bits of pixel-depth: 1920*1080*(3+1.5) =9.331.200 bytes, or

For 16 bits of pixel-depth: 1920*1080*(3+2)=10.368.000 bytes.

In case of 3D-video stream with 25 frames/second, the 3D RGB-D camera generates a data stream with 222 MB/s to 247 MB/s throughput. In case of several cameras used to capture the 3D-scene, it becomes almost impossible to stream such 3D-videos in real time over the general-purpose computer networks. The recording and storage of the captured raw 3D-frames is also problematic due to vast of data.

To solve this issue, the appropriate 2D-video and depth codecs are used for data compression. Data compression or bit-rate reduction involves encoding information using fewer bits than the original representation. Compression can be either lossy or lossless. An encoder refers to a device or algorithm that converts information from one format or code to another, for the purposes of compression. A codec is a device or algorithm for encoding or decoding a digital data stream for transmission or storage.

Use of data encoding and compression techniques is disclosed in several patent applications. Application No. U.S. Pat. No. 6,055,274 discloses compression of multi-view video streams. Application No. US2011069760 refers to the compression by disclosing a technique of 3D-video motion estimating that may enable a motion vector of a color image and a motion vector of a depth image refer to each other, thereby increasing a compression rate. Application No. U.S. Pat. No. 6,104,837 describes a specific depth compression technique by determining patches of adjoining pixels of the image which pixels of a patch have the same or similar depth values, and assigning a common depth value to all pixels of the patch. Application No. US2014055560 proposes (paragraph [0055]) that: "encoder may compress the reduced representations of the depth image and the depth reference model for storage and/or transmission. The encoder may be any sort of encoder, such as a 2D video encoder, a video/image coding scheme, like H.264/AVC, MPEG-2 or JPEG, etc.". However, Krishnamurthy et al. [1] points out that a straightforward application of 2D-picture or video compression algorithms to depth information does not lead to good results, because it introduces undesirable artefacts and distortions. The H.264 and JPEG are tailored for lossy compression of RGB 2D-videos and pictures so that the resulting video artefacts are minimally perceivable by the human eye. As a consequence, this does not necessarily minimize the residual error between the compressed and the original picture or video. For example, H.264 codec generates small compression artefacts in smooth and similarly colored areas and strong artefacts in areas with moving edges. These artifacts result in errors in the compressed data stream. For depth data, this means that smooth surfaces show comparably few errors in the reconstructed depth images, whereas edges are often strongly affected by the compression artifacts. As a result of that, the value of a pixel in the compressed depth image can be substantially different from the original one.

Rendering and visualization. The rendering and visualization of 3D-scene can be done by 3D-point-clouds comprising spatial pixels with colors. In certain applications, the neighboring points can be interconnected or interpolated to produce 3D-meshes for surface and scene visualization. Further, these point-clouds or surfaces are visualized on computer's 2D display with 3D rotation and zooming functions, or on 3D-TV sets, or by wearable 3D-goggles. The present invention is relevant to 3D rendering and visualization state of the art, mainly, to demonstrate the result and efficiency of the depth information processing techniques.

Conclusion.

there are numerous patent applications, disclosing 3D-video processing applications systems and methods related to depth data processing, coding and compression. They may disclose similar steps and functions of general purpose, for example, encoding, compression, reconstruction. However, there have also major differences to the present invention of how said coding, compression, reconstruction implemented, how functions sequenced in method workflow, and what is the purpose and expected result by the application.

The closest to the present invention is the MICROSOFT CORP patent application No. US2014055560 which discloses techniques for setting depth values for invalid measurement regions of depth images are described herein. A computing device may set the depth values based on evaluations of depth values of neighboring pixels and of corresponding pixels from time-adjacent depth images. Alternately or additionally, the computing device may utilize a texture image corresponding to the depth image to identify objects and may set depth values for pixels based on depth values of other pixels belonging to the same object. After setting the depth values, the computing device may normalize the depth values of the pixels. Further, the computing device may generate reduced representations of the depth images based on a depth reference model or a depth error model and may provide the reduced representations to an encoder. The sole purpose of US2014055560 is to enhance quality of the video by re-adjusting depth images by evaluating depth values of neighboring pixels in the depth image and depth values of pixels in other depth images of the plurality of depth images that are time-adjacent to the depth image.

However, US2014055560 discloses usage of straightforward 2D-picture compressing techniques for depth data (paragraph [0055]), that according to Krishnamurthy et al. [1] does not lead to good results, because it introduces undesirable artefacts and distortions. Another problem related to the many traditional codecs is related to depth channel width. The 8 bits are not enough, as disclosed by Nenci et al. [2], "depth data from a typical range sensor requires more than 8 bit to encode the distance information, e. g., 11 bit for the Kinect depth image and 16 bit for a Velodyne laser range scanner" and using "a baseline that consists of rescaling the 11 bit input stream of the Kinect to 8 bit for applying standard H.264 compression leads to substantially increased errors".

SUMMARY

The present invention is a data codec (encoder and decoder) for efficient compression and decompression of depth information in 3D-video visualization, recording and streaming applications (FIG. 1, FIG. 2 and FIG. 5) comprising stages, at least, of:

3D-scene acquisition into one or more 3D-video streams comprising raw 2D RGB pixel frames and the corresponding pixel-depth frames;

Alignment and filtering said 2D RGB and pixel-depth frames;

Encoding said 3D-video stream data, for compression;

Recording said 3D-video stream into a digital storage or streaming it through communication media to remote locations;

Decompression and decoding said 3D-video stream data;

Playback of said 3D-scene by means of rendering and visualization of said 3D-video stream.

The 3D-video stream for encoding is preferred with full depth information, i. e. each pixel of 2D-frame has its depth value in the corresponding depth frame. Such aligned 3D-streams may be acquired from typical RGB-D cameras (FIG. 1, 1000). Moreover, this invention is not limited by the acquisition of a 3D-video streams only from RGB-D cameras. Any other 3D-stream source of the aligned 3D-stream data can be used as the input. For example, a file of 3D-stream with the aligned depth frames, wherein depth frames have been previously re-created from multiple-view 2D-videos.

Further, the filtering stage (1100) is important because some depth values in 3D-stream aligned with 2D pixels, may still be erroneous due to acquisition noise and artefacts, or distorted by bit-quantization, e. g. by representing a depth value with 8 bits, and so on. These erroneous depth values are smoothened in the filtering stage. Further, the filtered depth data provides better quality of 3D-visualization.

Finally, the filtered 3D-streams are rendered (1200) and visualized (1300) as the virtual 3D-scene. Rendering (1200) is done by 3D-point-clouds comprising spatial pixels (voxels) with colors (1210). In some applications, the neighboring points may be interconnected or interpolated to produce 3D-meshes (1220) for 3D-scene visualization (1300). Afterwards, the point-clouds or meshes are visualized (1300) on computer's 2D display with 3D-rotation and zooming functions, or on 3D-TV sets, or by wearable 3D-goggles.

The general version of the application (FIG. 2) involves also remote locations and playback functionality and, correspondingly, comprises the additional stages of 3D-stream recording (2300), transmission (2400), encoding (2200) and decoding (2500). As usual, the digital storage sets data space limitation for recording, the transmission media sets bandwidth limitation for the maximum throughput or bitrate of the stream. Meanwhile, the encoder and decoder have the purpose to compress the 3D-video stream by such compression rate which allows to put the recorded and transmitted data through said limitations.

The physical environment for said general of 3D-video streaming, recording and visualizing applications (FIGS. 1 and 2) is depicted in FIG. 5.

Compression and decompression of 2D-video streams are done efficiently by a variety of codecs. For example, the most widely used and standard ones are H.264 for video streams and JPEG for still pictures.

As indicated by prior art, the compression of pixel-depth information by 2D-codecs does not lead to good results. Therefore, this invention provides a new codec for pixel-depth data encoding and decoding, which is different from any other video codecs.

The differences of this invention to the closest patent application US201405556 and the other prior-art-sources can be regarded as major, i. e., a person, skilled in the art, would not arrive to same solution for the same problem. Although, both the present invention and US2014055560 employ filtering for removal of the negative effects in the acquired depth data, however, the presented invention maintains controllable 3D-video quality of data compression, by employing, at least:

depth similarities between the neighboring rows of a single pixel-depth frame are employed to reduce amount of data, capabilities of rANS algorithm are employed to compress sets of pixel-depth values which have extremely uneven distribution, from a single pixel-depth frame, dynamic pixel-depth value interlacing at pixel level is employed, according to movements detected in different regions of the depth frame, said movements detected by comparing the neighboring pixel-depth frames.

A practical implementation of the invention addresses the problem of transmitting effectively the pixel-range data from a single or several depth sensors through a slow network connection. The implementation is built on top of the modern 2D video codec H.264, with the purpose to transmit the compressed version of the original pixel-depth data stream. Employment of the standard video codec provides several advantages: it saves years of research on video compression; it is highly effective as it leverages spatial-temporal relations in the data; it is easy to implement by given existing libraries; H.264 is supported by a large variety of devices. Also, this implementation is able to manage pixel-depth data streams in which the individual depth sample is described by more than 8 bits (for example, 12 or 16 bits) and proposes a range-based signal demultiplexing to reduce the effects of pixel-depth compression artefacts.

DESCRIPTION OF DRAWINGS

For better disclosure of the invention, the following figures are provided and referenced hereafter. These figures are given as examples only and in no way shall limit the scope of the invention.

FIGS. 3A-3C depict the noticeability of pixel depth registration and conversion errors, in case of 3D-scene visualization, rotation and zoom-in. FIG. 3A depicts a sample fragment of 3D-scene with 4 pixels. FIG. 3B depicts the value of the pixel p3 distorted. FIG. 3C shows the 3D-scene after rotating and zooming-in wherein pixel p3 is shifted to forward from the surface it belongs to.

FIG. 4A presents a portion of 3D-scene by its lateral view. FIG. 4B presents an introduced staircase-like distortion due to reducing depth channel width (e. g., to 8 bits). FIG. 4C presents said staircase-like distortion being partly hidden by smoothing filters.

DRAWINGS—REFERENCE NUMERALS

Figure 1:
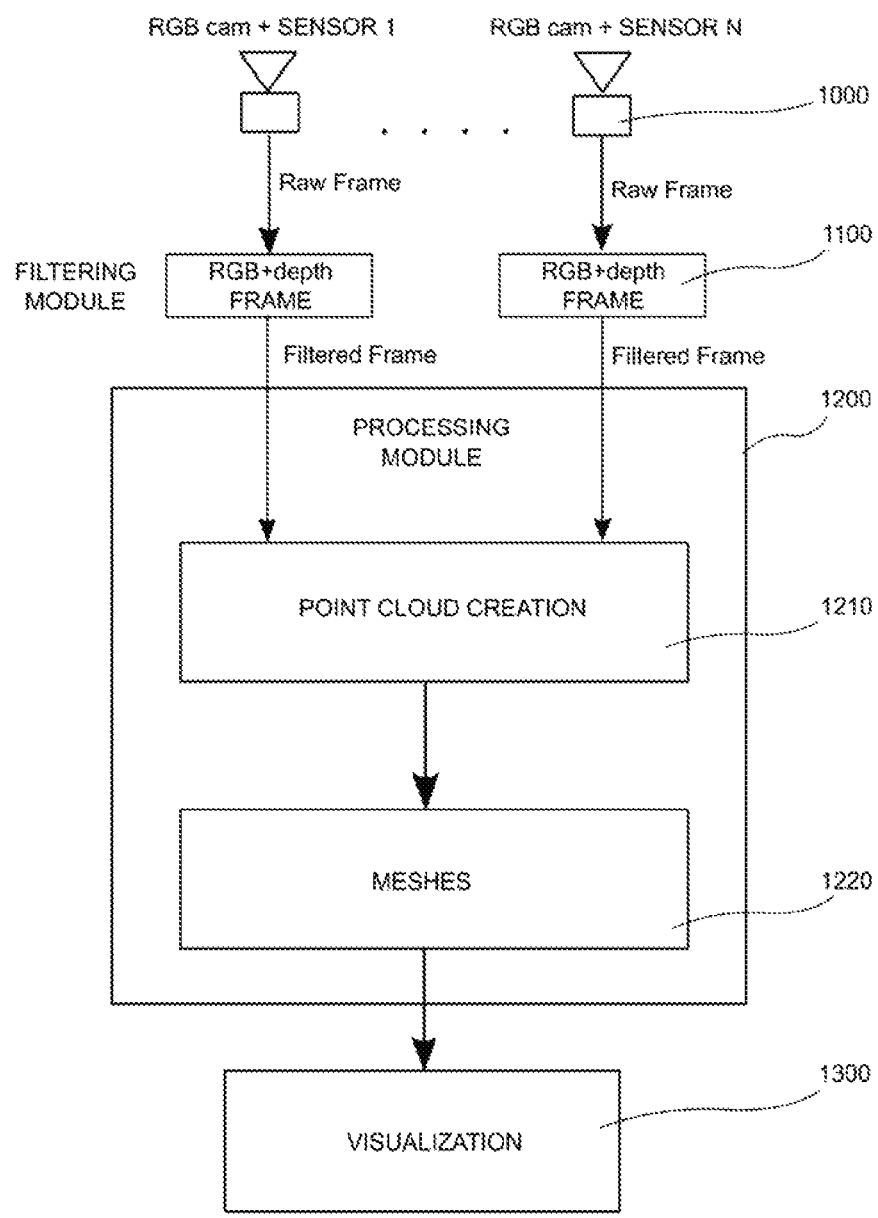
FIG. 1 illustrates the workflow of 3D-video with pixel-depth data filtering, processing and 3D-scene visualization.

1,2,3 video-cameras with composite 2D-video and depth data acquisition
4 Transmission media with a limited bandwidth
5 Remote computer or video station configured for visualization of the streamed 3D-video
6,7 Data storage of the compressed 3D-video data
8 computer or computing device configured to aggregate real-time video-data from several 2D-video+Depth cameras and further compress said data
1000 stage of video-data acquisition from 2D-video+Depth cameras
1100 stage of 2D-video+Depth data filtering
1200 stage of 3D-processing of 2D-video+Depth data
1210 stage of transforming 2D-RGB and depth frames into the joint-point clouds
1220 stage of transforming the point-clouds into surface meshes of 3D-scene objects, along with their textures
1300 stage of visualizing 3D-scene
2200 stage of 2D-RGB and depth data encoding
2300 stage of storing the encoded 2D-RGB and depth data
2400 stage of streaming the encoded 2D-RGB and depth data over the network with limited bandwidth
2500 stage of 2D-RGB and depth data decoding for 3D-visualization
4100 a portion of 3D scene by its lateral view
4200 a staircase-like distortion is introduced due to the limited width of the depth channel
4300 smoothing filters may partly hide the staircase-like distortion

DETAILED DESCRIPTION

The encoding and decoding of a 3D-stream depth is the core of this invention, and also the 3D-video data preparation, such as data alignment and filtering, is important.

Data Alignment.

The assumption is done that the 2D-video and depth data sets have to be aligned before further processing. It means, if depth information is missing due to some reasons, video information for such pixels is also discarded. The opposite relation is also true: if video information is missing, depth values should be also cleared. This restriction is implied by the following reason: video information tells what should be displayed and at the same time depth values shows where the pixel should be displayed. Only the pair what and where provides us integral information; it makes no sense to display what(something) if we don't know where it should be displayed—and vice versa.

Depth Data Artefacts and Filtering.

Filtering of 3D-stream depth data is the minor but important processing stage before the 3D-visualization and encoding.

In 3D-streaming applications and embodiments of this invention, separate codecs are used to encode and decode RGB and depth information. For video content, H.264/AVC (or Multiview Video Coding extension of H.264/AVC) is used in applications where lossy compression is sufficient. If frames are considered as separate pictures, JPEG compression (or other implementations based on discrete cosine transform and quantification) may be used. These codecs with lossy compression (such as JPEG used for single frames, or H.264 used for video) introduce non-controllable distortions that may be considered for displaying 2D picture as less noticeable. For example, a rectangular 2D-image of RGB pixels, with each pixel of yellow color (wherein R=255, G=255, B=0), is encoded and subsequently decoded. If during the lossy encoding and decoding, the blue channel is distorted and acquires a value B=20 for e. g. 10% of the image pixels, it would be hard visually to distinguish this chromatic distortion.

However, the use of these codecs for depth encoding can result into unpleasant and much noticeable artefacts of image quality. For example, if the same 10% distortion is introduced in the depth channel for a RGB-D camera being able to measure distances of, e. g. 200-5000 mm range, and using the channel width of 8 bits, such distortion would deviate the pixels' depth quite noticeably, by:

$$dShift=20*(5000-200)/254=378 \text{ mm}$$

Here, it is assumed that the depth value "0" has the meaning "impossible to measure depth value for a pixel".

Figure 3A:
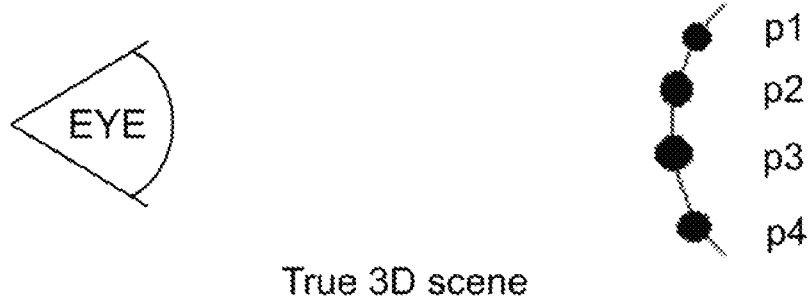
Figure 3B:
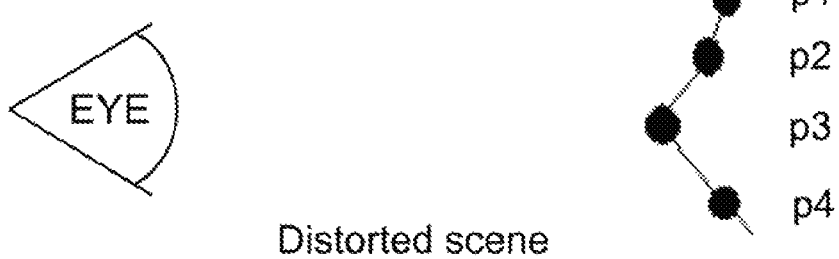
Figure 3C:
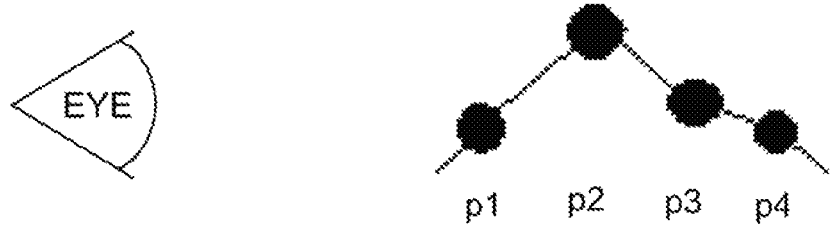

The stage of 3D-scene visualization usually comprises functions of 3D-rotation and zooming. FIGS. 3A-3C illustrate high noticeability of such type of distortion in the result of these functions applied. FIG. 3A depicts a sample fragment of 3D-scene with 4 pixels. In FIG. 3B, the value of the pixel p3 is distorted. It may be unnoticeable if the shift is parallel to the viewing direction. However, FIG. 3C shows that after rotating and zooming-in 3D-scene, it is quite noticeable that the pixel p3 is shifted to forward from the surface it belongs to. At the same time, rotation and zooming-in have only minor effect on pixels color perception.

Figure 4A:
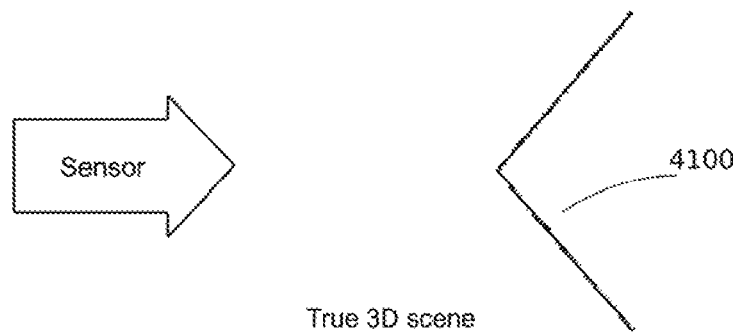
FIGS. 4A-4C illustrate the effects of the pixel-depth channel width reduction and filtering.
Figure 4B:
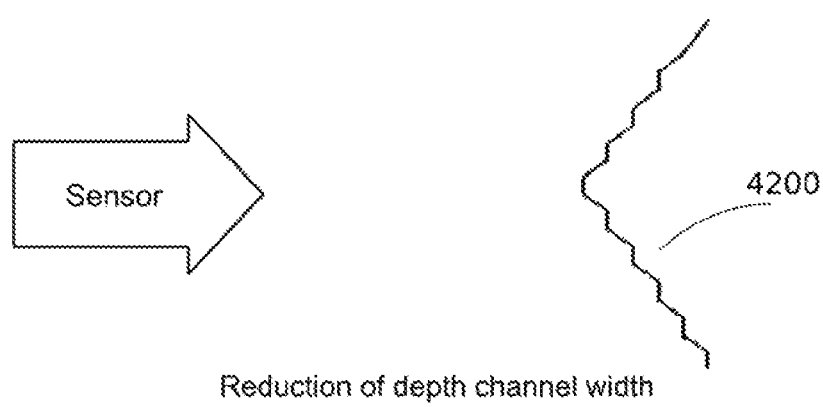
Figure 4C:
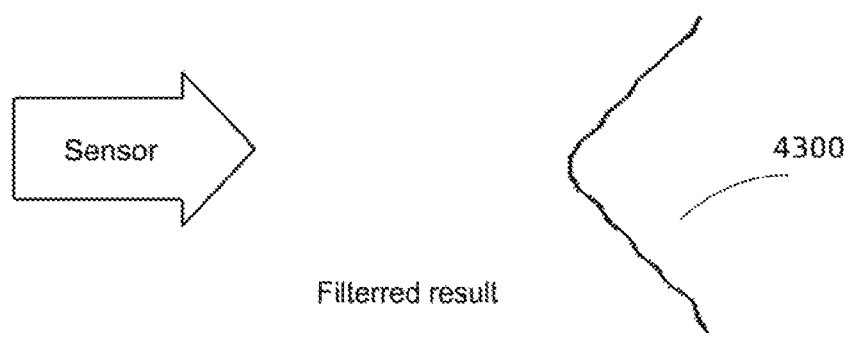

FIGS. 4A-4C depict distortions introduced by insufficient depth channel width or if depth values are downscaled by stripping some amount of less significant bits (quantization). In FIG. 4A, a portion of 3D scene by its lateral view (4100) is presented. If a depth sensor is able to register 200-5000 mm range, but only 8 bits are used as the depth channel width, a staircase-like distortion is introduced (4200 in FIG. 4B). Smoothing filters applied before the visualization step, may partly hide said staircase-like distortion (4300 in FIG. 4C). However, the smoothing filter also rounds all sharp corners and edges of real objects of the scene, by this introducing another type of distortion.

Depending on the 3D-stream acquisition quality, said filtering stage may be important in case if some pixel-depth values are erroneous due to acquisition noise, acquisition artefacts, distortions caused by quantization, e. g. by representing depth values with 8 bits.

During the filtering stage, the erroneous values are smoothened, and this also improves the encoding and compression performance.

In some cases, depth filtering or smoothening may be beneficial after the encoding and decoding with lossy compression which also introduces quantization artefacts. For example, a low-pass filtering may be used after downscaling and upscaling of a depth frame.

Depth Codec.

The codec implements controllable and predictable compression and decompression of 3D-video pixel-depth frames. The purpose of the codec is to compress and decompress the pixel-depth data of a live 3D-video stream, so it could adapt to the bandwidth limitations of communication media used for the stream transmission. The result of codec action is predictable by the resulting data volume or bitrate, visual 3D-view distortion due to lossy processing of data, and the processing speed (or amount of processing operations).

The pixel-depth frames are processed by the depth codec, for lossless or lossy compression and decompression of data. During the encoding stage, depth information is modified and compressed, and further streamed over a network or stored into a file. During the decoding stage, the reverse transformation, i. e., decompression, is applied to the depth data retrieved from the stream or file. Further, said pixel-depth frames are ready for 3D-scene rendering and presentation:

3D-source→Encoder→Stream/File→Decoder→3D-scene rendering and presentation

Compression of a Single Frame.

The depth codec uses Range Asymmetric Numeral Systems (rANS) algorithm [3] as the backend step of data encoding. Differently from DEFLATE implementations, e. g. zLib, the rANS algorithm performs faster and with higher compression rates, especially, if the distribution of values being compressed is strongly asymmetric. This feature is often taken into account when preparing the input data for the rANS algorithm.

A single RGB-D camera generates 3D-video frames of size N=h*w pixels, represented by depth and video matrices. A depth matrix $D=(d_{i,j})$ contains depth information, it is assumed that every $d_{i,j}$ is an integer number. A video matrix $V=(v_{i,j})$ stores video data in form of RGB triples (r, g, b) for all 1, i, h and 1, j, w. The alignment of D and V matrices is defined as:

$$d_{i,j} > 0 \text{ iff } v_{i,j} \neq (0;0;0)$$

or $$v_{i,j} \neq (0;0;0) \text{ iff } d_{i,j} > 0$$

A disparity matrix $S=(s_{i,j})$ is defined in the following way:

$$\begin{cases} s_{1,1} = d_{1,1} \\ s_{1,j} = d_{1,j} - d_{1,j-1} & \text{for } j = 2 \ldots w \\ s_{i,j} = d_{i,j} - d_{i-1,j} & \text{for } i = 2 \ldots h \text{ and } j = 1 \ldots w \end{cases}$$

The values $s_{i,j}$ (here i>1) of the disparity matrix S indicate how depth values within a particular row i in the depth matrix D are different from the corresponding values of the previous row. Since a captured 3D-scene contains h rows (for state-of-the-art applications h=512, 1080, 1280), such dissimilarities usually are quite minor.

Without loss of generality it is assumed that values of the matrix S are non-negative numbers, because it is possible to map the actual differences $s_{i,j}$ into non-negative values:

$$s_{i,j} = \begin{cases} 2*s_{i,j} & \text{if } s_{i,j} \geq 0 \\ -2*s_{i,j} & \text{if } s_{i,j} < 0 \end{cases}$$

The disparity matrix S contains items that are distributed extremely unevenly. Statistically, the most frequent values are 0, 1, -1, 2, -2 (or 0, 2, 1, 4, 3, if values are mapped to non-negative integers). For variety of investigated 3D-scenes and their disparity matrices, the top-first 4 values usually comprise 85%-98% of disparity items of D. The example is presented in FIG. 6: the top 10 values are shown; the rest contains 0.07% of all S values. In contrast to x top-frequent values, the remaining disparity values are distributed more evenly and correspond to the frame regions wherein the distance from the depth scanner to the object surface changes rapidly. Such regions are clustered mostly at the edges of objects within 3D scene.

Assume that $s_{max}$ is the largest value in S. Define frequency $n_k$ of a value k as a number of occurrences of k in the matrix S:

$$n_k = f(k) \text{ for } 0 \leq k \leq s_{max}$$

It is evident that a sum of frequencies for all possible values k is equal to the number of pixels:

$$\sum_{i=0}^{s_{max}} n_k = h*w$$

In the same way a probability of a value k may be defined as $$p(k) = n_k/(h*w).$$

If the disparity matrix S is compressed, the theoretical lower bound of a number of bits in the resulting bitstream is:

$$L_S = N \sum_{k=0}^{s_{max}} -\log(p(k)) * p(k) = -\sum_{k=0}^{s_{max}} n_k \log(n_k) + N \log(N)$$

here it is assumed that log (0)=0.

Transform the disparity matrix S into two lists of disparity values TOP and R, and the Boolean matrix B of the same size as S:

a list TOP; containing top x frequent values;
a list R, containing the remaining values;
a matrix B of 0/1 values wherein:
$b_{i,j}=1$ indicates that the value $s_{i,j}$ comes from the list R, otherwise $s_{i,j}$ is taken from the list TOP.

For example, if TOP={0, 0, 1, 3, . . . }, R={19, 7, 13, . . . } and B={0, 0, 1, 0, 1, 0, 1, . . . }, the first row of S starts with {0, 0, 19, 1, 7, 3, 13, . . . }.

These lists may be compressed to:

$$L_{TOP} = -\sum_{k=0}^{x-1} n_k \log(n_k) + \text{size(TOP)} \log(\text{size(TOP)})$$

$$L_R = -\sum_{k=x}^{s_{max}} n_k \log(n_k) + \text{size}(R) \log(\text{size}(R))$$

$$L_B = -\text{size(TOP)} \log(\text{size(TOP)}) - \text{size}(R) \log(\text{size}(R)) + N \log(N)$$

Here it is assumed that frequencies are rearranged in a way that top x values are at the beginning of the list (items 0 . . . x−1). Such straightforward compression introduces no gain, because the lower bounds sum up to the lover bound of compressed disparity matrix S:

$$L_{total} = -\sum_{k=0}^{s_{max}} n_k \log(n_k) + N \log(N)$$

Nevertheless, the entries in the list TOP may be coded using fewer number of bits. For example, if x=2, one bit is sufficient to represent top 2 values (0 indicates top frequent, 1—second frequent). If x=4, 2 bits may be used (00, 01, 10, 11 for top 4 frequent values). Such bit sequences may be packed into bytes—and this means a change of symbol alphabet. Instead of 16-bit values here we have 8-bit packed values. Such change may be (but not necessarily) beneficial. In the same way values in the list B (one-bit length) may be packed into bytes—8 values per byte.

Denote $L_{TOP}^x$, $L_B^x$, $L_R^x$ the lower bounds for compression of encoded lists TOP and B when x top frequent values are used. Herein for x=0, it is assumed $L_{TOP}^0=0$, $L_B^0=0$ and R contains all values from the disparity matrix S.

Calculate $$L^x = L_{TOP}^x + L_B^x + L_R^x$$

for x=0, 2, 4 and select the minimal value—this corresponds to an option that will be used for compression. For such lower bounds' calculation, it is not necessary to compress all 3 arrays—it is enough to construct encoded TOP, B and R arrays and calculate frequencies (this may be performed during single pass over the disparity matrix S).

Further, TOP, R and B for a selected x are passed to the step of compressing by rANS. The rANS algorithm compresses the input data in two modes: the 8-bit mode is used to compress the list TOP and the Boolean matrix B; the 16-bit mode is used to compress remaining values in the list R.

Figures 6, 7:
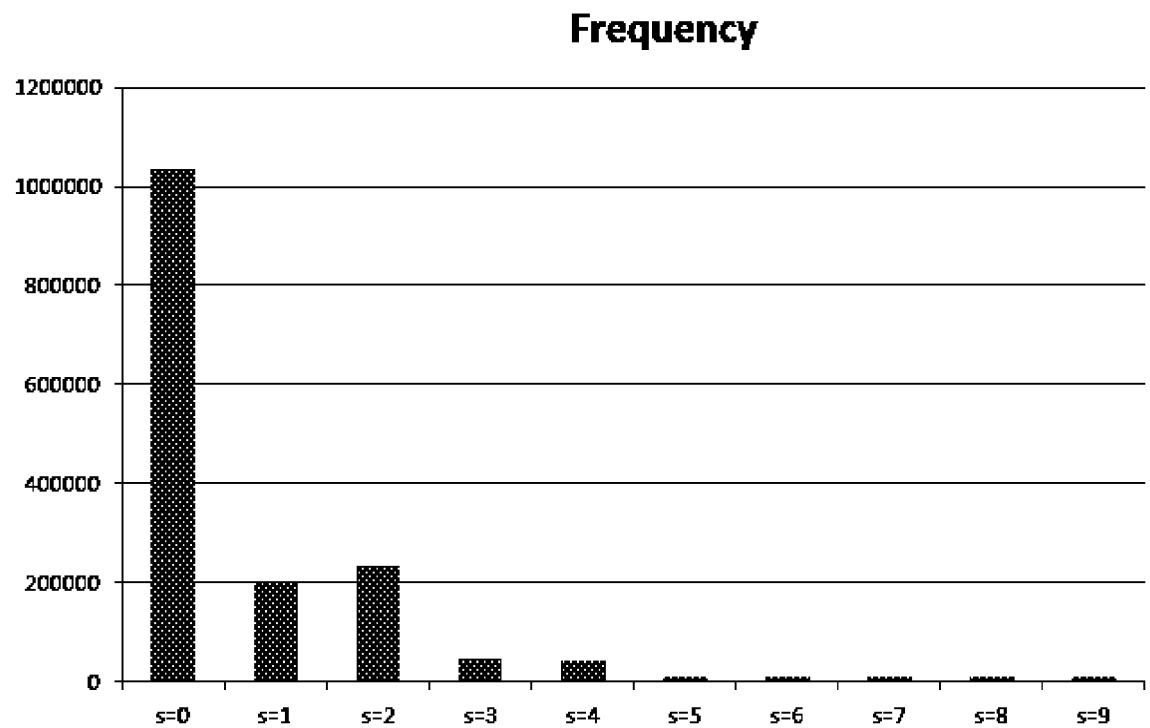
FIG. 6 contains an example of distribution of S top-ten values.
FIG. 7 presents a comparison of lossless codecs applied to 16-bit depth frame compression.

In FIG. 7 the comparison of our algorithm (denoted EF EV E™ codec) and JPEG200, PNG, TIFF and ZLib are presented for a data stream consisting of 100 HD definition frames (1920×1080 pixels), 16 bits depth information.

For streaming purposes, encoded and compressed depth frame is incorporated into H.264-bit stream as user data unregistered SEI message. During recording, encoded and compressed depth and RGB frames are directly written to a file.

Decompression of a Single Frame.

The pixel-depth decoder performs the transformations which are inverse to the above ones, correspondingly:

decompresses the lists TOP, R and B, by rANS decompression;
reconstructs the disparity matrix S from the lists TOP, R and B;
reconstructs the depth matrix D from the disparity matrix S.

Lossy Compression and Decompression of Subsequent Frames.

Interlacing (or interleaving) technique is widely used in video processing applications, for example, to reduce the amount of transferred data or to equalize data loads in time, for transmission through communication networks, etc.

In present codec, the interlacing concept is expanded to a pixel level, and applied as dynamically adaptable, specifically, for compacting the depth data in 3D-video streams.

The steady objects of 3D-scene have nearly the same depth presentation in a sequence of frames. By employing this similarity, it is possible to reduce the amount of depth data to be encoded and decoded.

Pixel-depth values of frame regions with no movement may be updated with a rate lower than the frame refresh rate (e. g., 25 fps), and without noticeable distortions. In contrary, the depth information of moving objects (especially, around their edges) have to be updated with maximum frequency, otherwise the 3D-view of such moving objects will be distorted.

Pixel-depth data interlacing between neighboring frames is implemented according to the following scheme:

The first pixel-depth frame is sent with the full amount of data;
subsequent frames are sent incomplete (pixels are skipped for regions where low or no movement is detected);
depth decoder receives the incomplete frame and reconstructs it by interpolating the missing pixel-depth values.

The pattern by which pixel-depth values are interlaced between the neighboring frames is represented by 8 or more bits. For example, the bit pattern 1011 0110 indicates that 2nd, 5th and 8th depth values are skipped. Therefore, only 5 depth values are sent instead of 8 ones for every group of 8 consecutive pixels, and an interlacing factor is I=5/8. The interlacing factor I indicates how often pixel-depth information is updated in a sequence of frames. The interlacing factor I=1/8 means that every depth value is updated only once after 8 frames are sent, and interlacing factor I=5/8 indicates 5 updates during 8 frames. The interlacing factor I=8/8 indicates that no interlacing is done.

To increase smoothness of the whole 3D-scene, rows within the regions are interleaved. That means, if one row includes pixels according to the pattern 1011 0111, the next row will have pattern 1101 1011, the next one—1110 1101, and so on. This bit pattern is rotated—the last bit becomes the first one, and other bits are shifted to the right by one position. Every 3D-scene may contain both steady and moving objects, therefore, different interlacing patterns are used for different regions. To represent different regions, a quad-tree of a limited depth is used.

Figure 8:
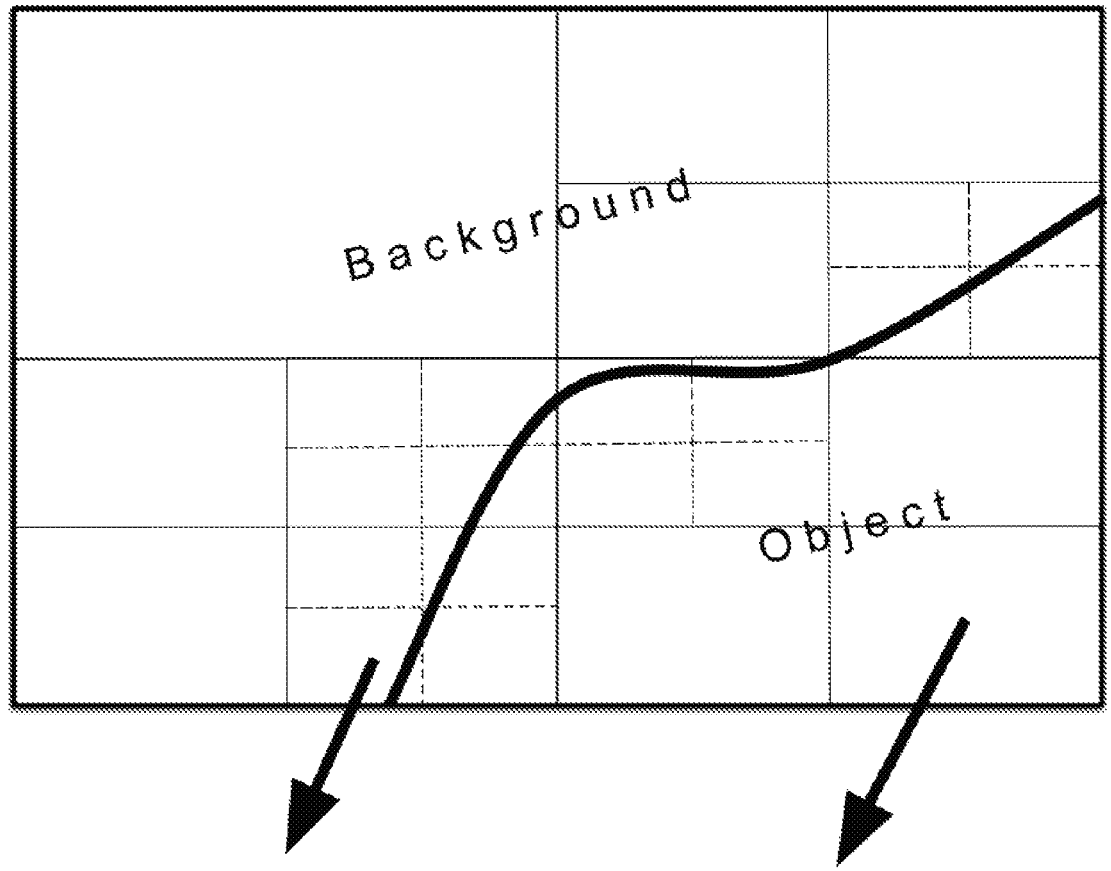
FIG. 8 illustrates pixel-level interlacing for regions with different movement.

In FIG. 8 a quad-tree for a portion of scene (pixel-depth frame) is presented. It contains a background and a moving object. A region R1 includes an edge of a moving object, therefore a movement is detected. For this region interlacing is performed using the pattern 1011 0111 and I=5/8. A region R2 is more stable and therefore lower interlacing factor is applied (the pattern is 1001 0010 and I=3/8).

After interlacing, every such region is treated as independent depth image—the items of disparity matrix S are calculated individually. Further, all individual matrices S are combined into the compound data array that is compressed by a lossless compression algorithm, herein, rANS-algorithm.

To reconstruct the original pixel-depth frame, the decoder is provided with the information about the detected movement regions and the corresponding interlacing patterns for every said region.

The depth decoder interpolates skipped pixels using depth values of neighboring pixels and the previous known value of the pixel. Assume $d_{last}$ is the last received depth value for the pixel $d_{i,j}$. Its adjacent pixels are $d_{i-1,j-1}$, $d_{i-1,j}$, $d_{i-1,j+1}$, $d_{i,j-1}$, $d_{i,j+1}$, $d_{i+1,j-1}$, $d_{i+1,j}$, $d_{i+1,j+1}$. Denote two adjacent pixels $d_{i,j}$ and $d_{k,l}$ as neighboring ones if $|d_{i,j}-d_{k,l}|\sqrt{}/d_t$; here $d_t$ is a threshold value. Then the interpolated value $d_{new}$ is calculated as follows:

$$d_{sum} = \sum_{k=i-1}^{i+1} \sum_{l=j-1}^{j+1} d_{k,l} w_{k,l}$$

$$d_{new} = \frac{d_{sum}}{\sum_{k=i-1}^{i+1} \sum_{l=j-1}^{j+1} w_{k,l}}$$

Here $w_{k,l}=1$ if $d_{i,j}$ and $d_{k,l}$ are considered as neighboring ones and $w_{k,l}=0$ otherwise.

Unlike JPEG and H.264, the present codec introduces pixel-depth information artefacts and distortions which are known and controllable (by selecting the higher or lower interlacing factor). These artefacts and distortions further can be partly filtered-out during the decoding stage. Such control of distortions allows achieving the desirable trade-off between the visual quality of the presented 3D-scene and data stream throughput.

Embodiments

Figure 2:
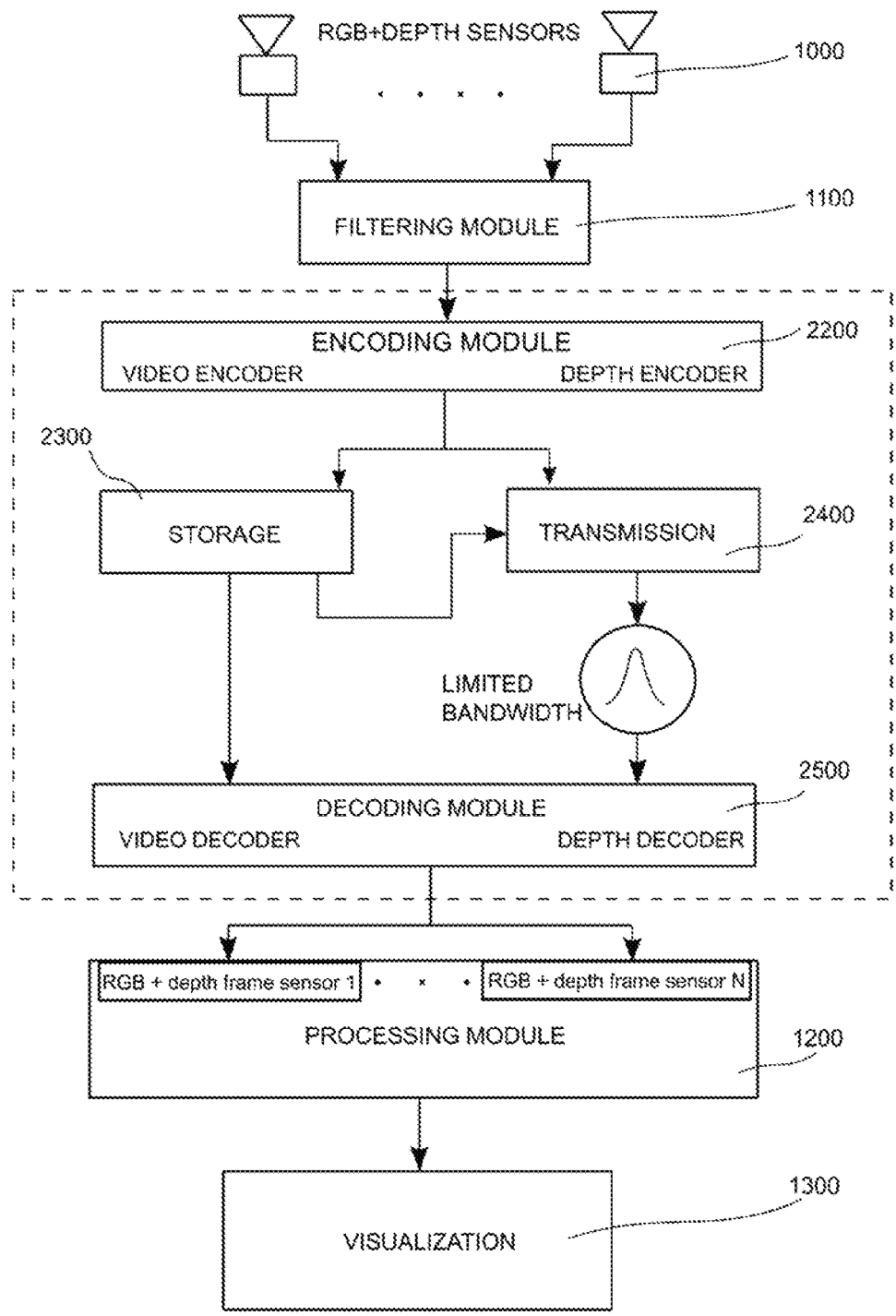
FIG. 2 illustrates the general workflow of 3D-video and depth data processing, for recording of volumetric video and/or streaming it to a remote location over a computer network for remote recording and visualization.
Figure 5:
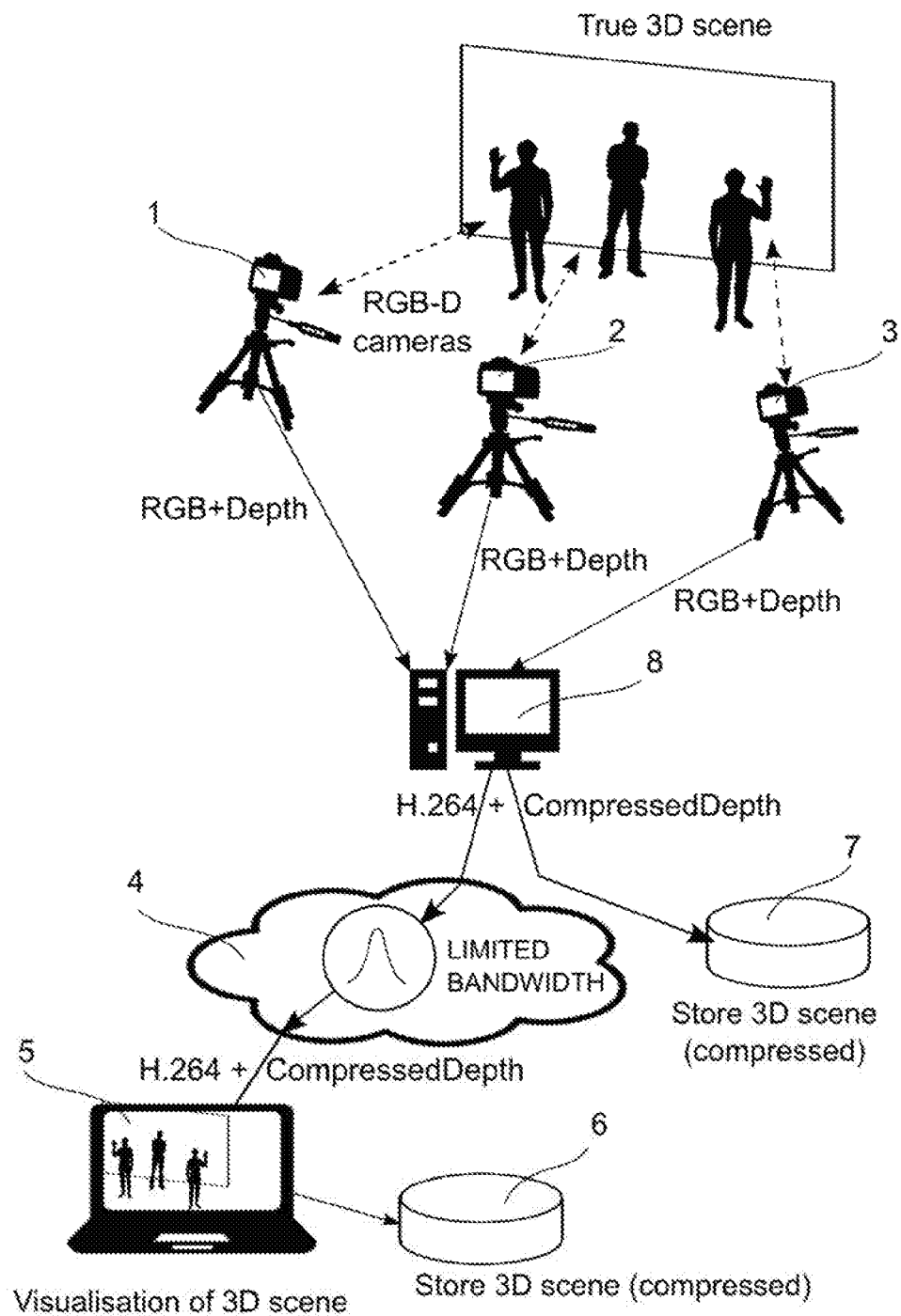
FIG. 5 illustrates the physical environment of the depth codec embodiments.

The general embodiment and physical environment of the depth codec implementation is presented in FIGS. 1, 2 and 5. There is a plurality of 3D-video cameras installed, for sufficiently complete capturing of the apparent 3D-scene ((1), (2) and (3) in FIG. 5). Each 3D-video frame from every camera is represented by two data sets: the 2D-video RGB frame and the corresponding frame of depth information. The pixel-depth is measured in millimeters, but any other distance measurement units may also be used.

The workflow in FIG. 1 may be considered as the embodiment for visual quality reference wherein plurality of RGB-D cameras is connected directly to a computing device implementing also the point-cloud or mesh rendering and visualization of 3D-scene. This embodiment does not include data codec, transmission and recording; however, it may be useful to check visual quality of the uncompressed 3D-video stream in order compare it to the visualizations of compressed 3D-streams. The initial 3D-video stream acquired from the RGB-D cameras during the acquisition (1000), further is passed to filtering function (1100). Function (1100) refines the raw images by filtering a random noise introduced during the 3D-video acquisition (1000). Further, the filtered 2D-RGB and depth frames are passed to 3D-processing stage (1200) with functions (1210) and (1220). Function (1210) performs transformation of 2D-RGB and depth frames into the joint-point clouds. Function (1220) transforms said point-clouds into surface meshes of 3D-scene objects, along with their textures. Finally, the transformed 3D-video data is passed to the stage of 3D-scene visualization (1300). The input data for stage (1300) comprises the meshes and textures of 3D-scene objects. However, if the meshes are not created due to high computational complexity, then the 3D point-cloud may be visualized during the stage (1300).

The workflow in FIG. 2 depicts the depth data processing if the acquired 3D-scene is visualized on a remote computer (5), or the recording of 3D-video data is performed into the storage of the local computer (7) or the storage of the remote computer (6). The initial 3D-video stream in acquired from a plurality of RGB-D cameras (1, 2, 3) in the acquisition step (1000). Filtering (1100) refines the raw data information from a random noise introduced in the 3D-video acquisition stage (1000). Further, the RGB and depth frames are passed to 2D-video and pixel-depth data encoders (2200) for compression. The purpose of the encoders is to transform and compress the raw frames. Encoder (2200) compresses frames received from multiple RGB-D cameras and multiplexes them into a single data stream (8). For RGB and depth frames, separate video and depth encoders are used.

Lossless or lossy conversion/compression techniques may be applied by option.

Further, the compressed 3D-stream may be recorded (2300) into a local storage (7) or transmitted (2400) over a computer network to a remote computer (5) wherein the decoder (2500) decompresses the stream. Decoder extracts the compressed information by separate 2D-video and depth decoders and restores separate RGB and depth frames of each RGB-D camera (1), (2), (3). Several codec implementation embodiment examples are described below.

1) "Embodiment of real-time remote streaming": the compressed stream is transmitted from the encoder (2200) over a computer network (2400) to the decoder (2500). The decoder (2500) restores the RGB and depth frames which further are transformed into point-clouds or meshes by 3D-rendering function (1200) and finally presented by visualization function (1300).

2) "Embodiment of local recording and playback": the compressed stream from the encoder (2200) is recorded (2300) into the local storage space. Further, the recorded information is retrieved from the storage and submitted to the decoder (2500) for the playback (1200) and (1300). There is no transmission over the computer network, it means, the encoder (2200), storage (2300) and decoder (2500) are implemented locally within the same computing device.

3) "Embodiment of local recording and streaming": the compressed stream from the encoder (2200) is recorded (2300) into the local storage space. Further, the recorded information is retrieved from the storage, transmitted over the communication media (2400), and further submitted to the decoder (2500) for the playback (1200) and (1300).

4) "Embodiment of simultaneous local recording and real-time streaming": the output of the encoder (2200) is recorded (2300) into the local storage space and, in parallel, transferred (2400) over the computer network and on the remote site submitted to the decoder (2500) for the real-time playback (1200) and (1300).

The above embodiment descriptions are only several examples which in any way do not limit the scope of codec implementation cases and applications. There are many more embodiments possible, like "simultaneous remote recording and real-time streaming", or "simultaneous local/remote recording and local/remote real-time streaming", or any other combination of the above. Also, embodiment variations are possible for using the codec in lossless or lossy compression modes, etc.

In all embodiments, for 2D RGB frames compression and decompression the standardized H.264 or JPEG codecs are preferred. However, there is no limitation to use any other codecs for this purpose.

The invention claimed is:

1. A method of data encoding and decoding in 3D-video processing applications, said applications comprising stages, at least, of:
    3D-scene acquisition by one or more 3D-video stream, wherein said 3D-video stream comprises a sequence of 2D-picture frames and the corresponding pixel-depth data frames,
    filtering of said 3D-stream,
    encoding said 3D-stream,
    transmitting said 3D-stream via communication media of limited bandwidth,
    recording said 3D-stream into a digital storage,
    decoding said 3D-stream,
    rendering and visualization of 3D-scene from said 3D-stream,
    characterized in that the method comprises steps of pixel-depth frame data encoding and decoding, wherein
    depth similarities between the neighboring rows of a single pixel-depth frame are employed to reduce amount of data, capabilities of rANS-algorithm is employed to compress sets of pixel-depth values which have extremely uneven distribution, from a single pixel-depth frame, dynamic pixel-depth value interlacing at pixel level is employed to compress sets of pixel-depth values, according to movements detected in different regions of the frame, said movements detected by comparing the neighboring pixel-depth frames.

2. The method according to claim 1, characterized in that the depth range data encoding and decoding steps have controllable and predictable amount of data processing operations.

3. The method according to claim 1, characterized in that the depth range data encoding and decoding steps provide controllable and predictable volume of said pixel-depth data.

4. The method according to claim 1, characterized in that the depth range data encoding and decoding steps provide a controllable visual quality of said depth range data.

5. The method according to claim 1, characterized in that said encoding and decoding steps allow lossless encoding and decoding of the depth range data.

6. The method according to claim 1, characterized in that said encoding and decoding steps allow lossy encoding and decoding of the depth range data.

7. The method according to claim 1, characterized in that said method is applicable for applications with real-time streaming of 3D-videos over a communication media with a limited bandwidth.

8. The method according to claim 1, characterized in that said method is applicable for applications with recording of 3D-videos into a digital storage with a limited space.

9. The method according to claim 1, characterized in that said 3D-video encoding and decoding stages comprise at least one embodiment on the basis of the standardized 2D-video encoding-decoding framework, at least, H.264.

* * * * *